United States Patent
Kunz et al.

[11] 3,914,175
[45] Oct. 21, 1975

[54] APPARATUS FOR THE SEPARATION OF DIFFICULTY MISCIBLE OR NON-MISCIBLE LIQUIDS

[75] Inventors: Otto Kunz, Rainer Hartmann, both of Frankfurt; Johann Nicolay, Sinnersdorf, all of Germany

[73] Assignee: Metallgesellschaft Aktiengesellschaft

[22] Filed: Dec. 21, 1972

[21] Appl. No.: 317,338

[30] Foreign Application Priority Data
Dec. 24, 1971  Germany............................ 2164477

[52] U.S. Cl. .................. 210/73; 210/498; 210/521; 210/522; 210/DIG. 21
[51] Int. Cl.² ................. B01D 37/00; B01D 39/10; B01D 17/04
[58] Field of Search............. 210/521, DIG. 21, 498, 210/320, 73, 522

[56] References Cited
UNITED STATES PATENTS

| | | | |
|---|---|---|---|
| 2,793,186 | 5/1957 | Dunell et al. ........................ | 210/521 |
| 3,385,439 | 5/1968 | Bach ............................... | 210/522 X |
| 3,412,861 | 11/1968 | Rudbach et al................. | 210/320 X |
| 3,666,112 | 5/1972 | Pielkenrood et al................ | 210/521 |
| 3,813,851 | 6/1974 | Eder ............................... | 210/521 X |

FOREIGN PATENTS OR APPLICATIONS
22,546   1891   United Kingdom................. 210/521

Primary Examiner—Frank A. Spear, Jr.
Assistant Examiner—Ferris H. Lander
Attorney, Agent, or Firm—Burgess, Dinklage & Sprung

[57] ABSTRACT

Apparatus for the separation of liquid dispersions of two or more mutually insoluble or only partially soluble liquids into the individual liquid phases comprising a separating tank with fittings of zig-zag shaped plate-like fittings arranged layer-wise one over the other the peaks of which are located one over the other and whose valleys are located one over the other, extending horizontally in the direction of the liquid throughput, the outlets for the separated phases in the peaks and valleys of the plate-like fittings, and, for the uniform distribution of the liquids to be separated, diffusing means ahead of the plate-like fittings.

17 Claims, 13 Drawing Figures

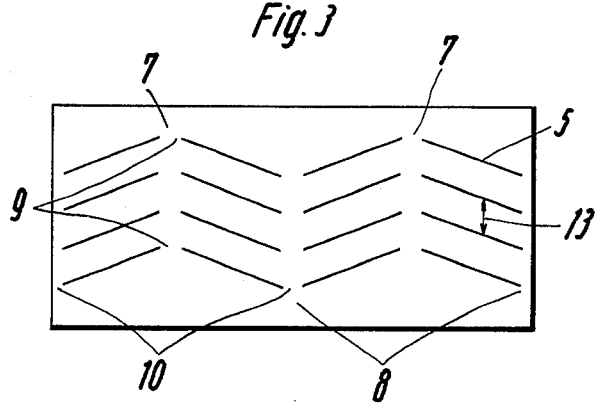
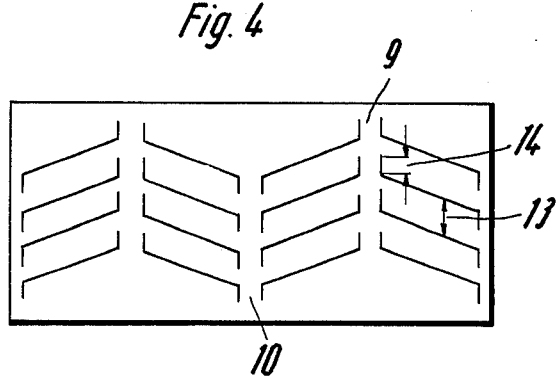
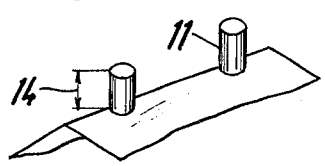 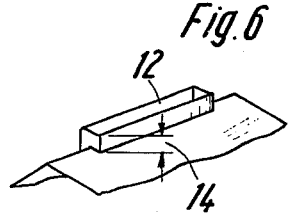

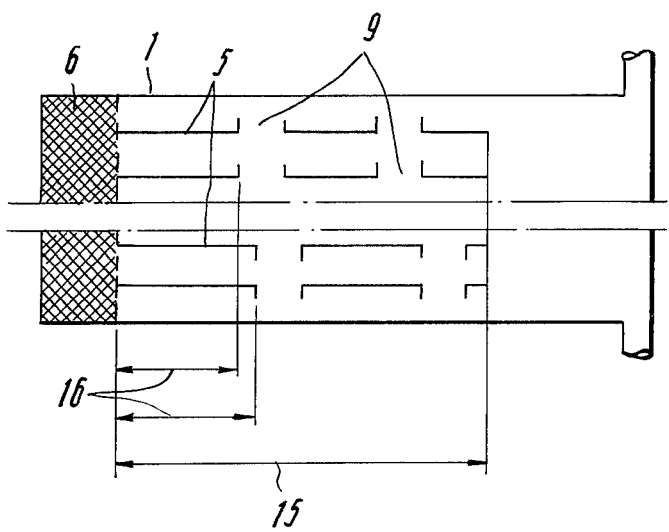
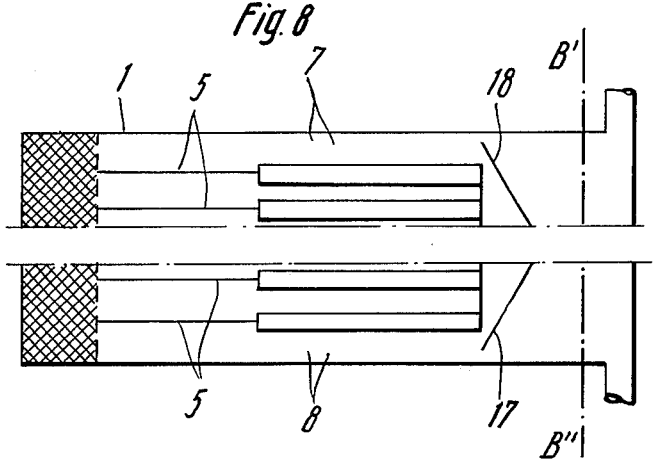

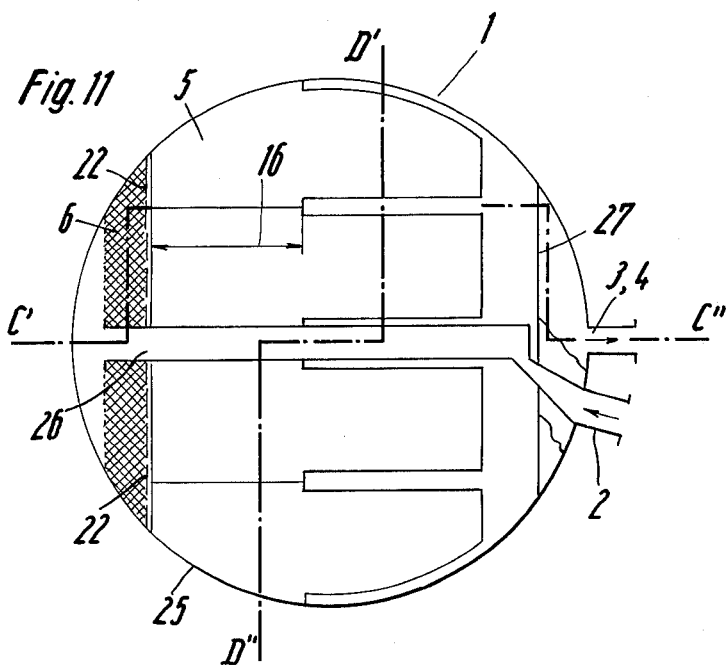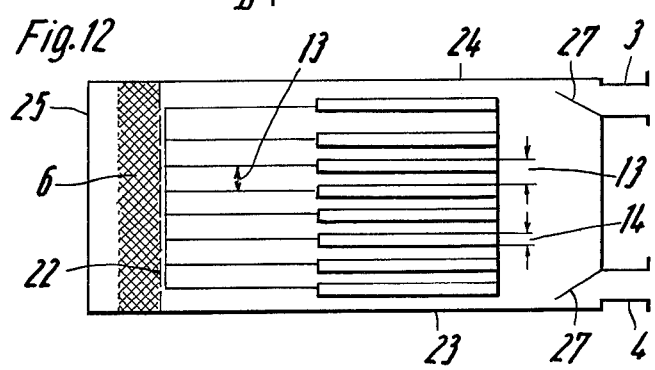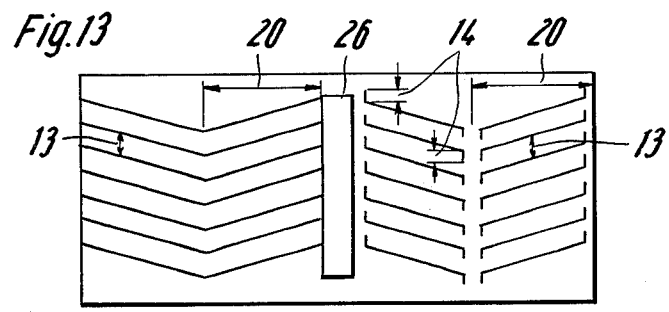

APPARATUS FOR THE SEPARATION OF DIFFICULTY MISCIBLE OR NON-MISCIBLE LIQUIDS

BACKGROUND

The invention relates to an apparatus for separating fluid dispersions of two or more mutually insoluble or only partially soluble liquids into the individual liquid phases in a natural or artificial gravitational field. The apparatus consists of a separting tank containing stacks of corrugated or zig-zag shaped baffle plates whose peaks and valleys are in line with one another vertically and extend horizontally in the direction of the liquid throughput.

In such apparatus the liquid mixture must stay in the separators for a certain length of time in order to achieve a sufficient separation of the phases, such time depending on the density of the two phases, on their viscosity, and on their interfacial tension as well as other factors.

To reduce the time of stay necessary for the separation of the liquid mixture it is in the prior art to install, in horizontal settling tanks for the separation of liquids, baffle plates of corrugated profile whose peaks and valleys extend in the direction of flow of the liquids and which are stacked one above the other such that peak lies above peak and valley lies below valley so that the separating liquids may collect in the longitudinal troughs formed by the shape of the plates, before they pass into the non-divided space in the settling tank. The baffle plates may also consist of zig-zag shaped metal plates (German Pat. No. 855,990).

It is furthermore in the prior art, to improve the phase separation and to improve the throughput, to install in the phase separator a packing which fills the phase separator but does not substantially diminish its free cross-section, and which consists of sharp-edged bodies, such as metal turnings for example, which have 10 to 25 cm of sharp edges for each cm² of surface, and whose dimension in one direction is at least three times as great as in the other directions (German Pat. No. 1,442,444).

It has also been proposed to arrange a set of plates extending vertically in the direction of flow ahead of the set of horizontal plates in a separator, in such a manner that a free space is left above the top horizontal plate up to 30% of the inside height of the separator, the free space extending over about 10% of the inside height of the separator (German Pat. No. 1,243,645).

Apparatus having the prior-art corrugated baffle plates do bring about a good separation of the phases; however, only relatively low throughputs are achieved per square meter of ground surface area of the separating tank. These apparatus are suitable mainly for the separation of those mixtures in which one component is present in a substantially lower concentration than the other.

An improvement of separation performance is achieved by filling the phase separator with a packing of sharp-edged bodies, especially metal turnings. This improvement is achieved particularly due to the fact that a droplet enlargement is caused by the passage of the liquid mixture over bodies having a large number of sharp edges and points.

Difficulty is encountered, however, whenever liquid mixtures are to be separated which contain components that tend to polymerize. The polymer attaches itself to the sharp edges and points of the packing and results in an impairment of separating efficiency.

SUMMARY

It is the object of the invention to eliminate these and other disadvantages of the state of the art. With the invention it is to be possible to separate even mixtures in which both components are present in relatively high proportions. The separator is to be characterized by a high surface area loading capacity and is also to permit the separation of liquid mixtures which contain easily polymerizing components.

This object is achieved in accordance with the invention by an apparatus consisting of a separating tank with baffling composed of stacked, corrugated or zig-zag shaped baffle plates whose peaks and valleys are disposed one over the other and extend horizontally in the direction of the liquid throughput, which is characterized by the fact that outlets 9 and 10 are provided in the peaks 7 and valleys 8 of the baffle plates 5 for the phases to be separated, and for the uniform distribution of the liquids to be separated, a diffusing means 6 is provided ahead of these baffle plates 5.

The invention is further described diagrammatically by way of example with the aid of the drawings and embodiments:

FIG. 3 shows the outlets in the peaks and valleys in accordance with the invention.

FIG. 4 is a special embodiment of these outlets.

FIG. 5 is an embodiment of the outlets in tubular form.

FIG. 6 is a duct-like embodiment of the outlets.

FIG. 7 shows the arrangement of the outlets along the length of the baffle plates.

FIG. 8 is a further development of the invention with plates set at an angle at the end of the baffle plates.

FIG. 11 is a special construction of the separating chamber 1 with a circular plan.

FIG. 12 is a cross section along C'–C'' through FIG. 11.

FIG. 13 is a cross section along D'–D'' through FIG. 11.

DESCRIPTION

Figure 1:
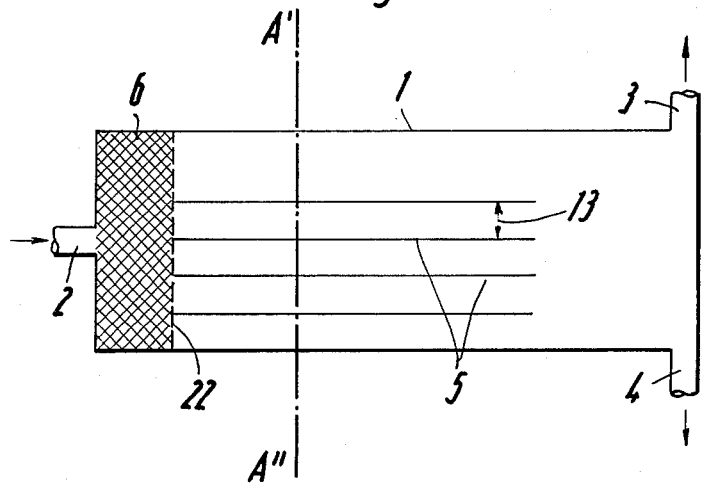
FIG. 1 is a diagrammatic, cross sectional, elevational view of the apparatus of the invention.
Figure 2:
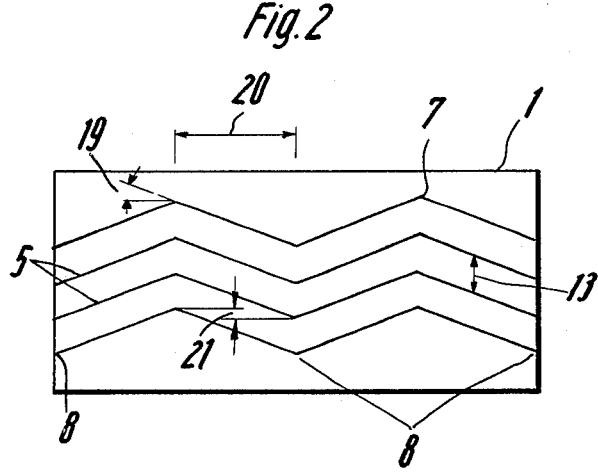
FIG. 2 is a cross section taken along line A'–A'' through FIG. 1.

Preferably, the angle of inclination 19 of the baffle plates 5 between the peaks 7 and the valleys 8 amounts to 5° to 30°, preferably 10° to 30°.

It is desirable for the ratio of the space 13 between the baffle plates 5 and the difference of elevation 21 between the peaks 7 and the valleys 8 to be between 0.5 and 3.0, and preferably between 0.7 and 2.0.

According to a preferred development of the invention, the ratio of the distance 20 between the peaks 8 and the valleys 8 to the space 13 between the baffle plates amounts to between 2.0 and 15.0, preferably 4.0 and 8.0.

A further development of the apparatus of the invention lies in constructing the outlets 9 and 10 for the phases to be separated in the form of ducts 12 or tubes 11, the height 14 of the outlets amounting advantageously to at least 25% of the space 13 between the individual baffle plates 5.

The outlets 9 and 10 may also, within the scope of the invention, begin at a distance 16 of one third of the length of the baffle plates 5 from the entrance of the liquids into the baffle plates 5.

According to a further development of the invention, by plates 17 and 18 are disposed at the end of the baffle plates 5 ahead of the peaks 7 in the lower part of the separating tank and ahead of the valleys 8 in the baffle plates 5, the surface of said plates 17 and 18 being athwart the direction of flow of the liquid and being set at such an angle thereto that the distance between them and the baffle plate 5 increases toward the center of the separator tank 1.

According to a further development of the invention the overall cross section of the outlets 9 and 10 in the peaks 7 increases from the lowermost baffle plates 5 to the uppermost baffle plates and/or from the uppermost to the lowermost baffle plates.

The outlets 9 in the peaks 7 may advantageously also have a greater cross section or a lesser cross section than the outlets 10 in the valleys 8.

The diffuser means 6 may advantageously consist of a packing or filling disposed ahead of a perforated plate 22, this packing or filling consisting preferably of material in fiber and/or ribbon form.

The material in fiber and/or ribbon form may consist of organic substances, such as plastics. It consists preferably, however, of inorganic and/or metallic substances.

An example of such an inorganic or metallic substance is ceramic material, which may be dense or porous, and may be in the form of so-called column packing bodies. But fibrous asbestos, glass filaments or glass wool may also be used as packing or filling material. Metal turnings have proven valuable as metallic substances.

One is the separating tank, 2 an inlet for the liquid mixture that is to be separated, and 3 an outlet from the separating chamber for the separated lighter liquid; 4 is an outlet from the separating chamber for the separated heavier liquid, 5 the stacked baffle plates, 6 a liquid diffusing means, 7 peaks in the baffle plates, 8 valleys in the baffle plates, 9 outlets for the separated lighter liquid in the peaks and 10 outlets for the separated heavier liquid in the valleys in the baffle plates.

Eleven represents outlets in the form of tubes and 12 outlets in the form of ducts of elongated cross section; 13 is the spacing between the baffle plates and 14 the height of the duct-like or tubular outlets, 15 is the length of the plates, 16 the distance of the outlets from the beginning of the baffle plates, 17 a deflector plate in the lower part of the separating tank 1 and 18 a deflector plate in the upper part of the separating tank 1; 19 identifies the angle of inclination of the baffle plates between the peaks and valleys, 20 the distance between the peaks and valleys and 21 the vertical difference between peaks and valleys of two adjacent baffle plates; 22 is a perforated plate; 23 the flat bottom of the separating chamber, 24 the flat cover of the separating chamber, 25 the cylindrical wall of a separating chamber, 26 a rectangular passage for the infeed of the liquid mixture to be separated, 27 deflectors in front of the outlets 3 and 4 for the separated liquids.

The apparatus of the invention may be used basically for the separation of any disperse system of liquid phases. For example, a condensate produced in the steam distillation of organic substances can be separated advantageously by means of the apparatus of the invention into the individual phases. Also facilitated is the separation into individual phases of the dispersions produced in the acid or alkaline washing of organic substances or mixtures of organic substances. In addition, the product mixtures which are yielded in technical syntheses, and which are in different liquid phases, such as the mixtures of water and hydrocarbons which are produced in the thermal cracking of hydrocarbons, can advantageously be separated. The apparatus of the invention may be used in an especially advantageous manner for the separation of the disperse liquid phase systems obtained in liquid-to-liquid extraction processes.

An example of the application of the apparatus of the invention to the separation of disperse systems obtained in liquid-to-liquid extractions is the separation of cyclopentene and/or conjugated $C_5$ diolefins from mixtures containing not only these but also paraffinic, naphthenic and/or olefinic $C_5$ hydrocarbons, or the separation of benzene, toluene and/or xylene from hydrocarbon mixtures which in addition to these aromatic hydrocarbons contain paraffinic, naphthenic and/or olefinic hydrocarbons with approximately 6 to 9 carbon atoms. Processes for the extraction of the above-named hydrocarbon mixtures by means of selective solvents, such as, for example, N-methylpyrrolidone, morpholine, dimethylformamide, sulfolan, acetonitrile or furfurol are known (German "Offenlegungsschrift" 1,941,704 and Erdol und Kohle 24, 573-578 (1971)). The invention accordingly relates additionally to the application of the apparatus of the invention to the separation of disperse liquid phase systems, especially those produced in liquid-to-liquid extractions.

Accordingly, in processes for obtaining cyclopentene and/or conjugated $C_5$ diolefins from the above-mentioned hydrocarbon mixtures through liquid-to-liquid extraction with selective solvents, the disperse system of liquid phases produced in the liquid-to-liquid extraction can be separated in an especially advantageous manner into (a) a solvent phase charged with cyclopentene and/or conjugated diolefins and (b) a raffinate phase consisting of paraffinic, naphthenic and olefinic $C_5$ hydrocarbons if the separation of the disperse system of liquid phases produced in the liquid-to-liquid extraction is performed by means of the apparatus in accordance with Claims 1 to 16. In like manner, in the case of processes for the production of benzene, toluene and/or xylene from the above-mentioned hydrocarbon mixtures through liquid-to-liquid extraction with selective solvents, the disperse system of liquid phases produced in the liquid-to-liquid extraction can be separated in an especially advantageous manner into (a) a solvent phase charged with benzene, toluene and/or xylene, and (b) a raffinate phase consisting of paraffinic, naphthenic and olefinic hydrocarbons by performing the separation of the dispersed system of liquid phases obtained in the liquid-to-liquid extraction by means of the apparatus in accordance with Claims 1 to 16.

From the charged solvent phases obtained by means of the apparatus of the invention, the hydrocarbons separated in this manner can be isolated in a known manner by stripping.

The advantages attained by the invention consist especially in the fact that it is possible with the apparatus of the invention to reliably separate liquid dispersions of mutually insoluble or only partially soluble liquids. This can be done successfully even when both of the phases to be separated are present in approximately the same proportion. The output is decisively better than it is in the known apparatus of this kind. In particular, the throughput of disperse material per square meter of ground area is substantially increased, so that the apparatus of the invention operates very economically.

Another important advantage of the proposed apparatus for the separation of liquid dispersions consists in the fact that liquid mixtures can also be separated which contain easily polymerizing components or components having a tendency to polymerize.

EXAMPLES

EXAMPLE 1

A mixture consisting of about 45 to 50% by volume of the solvent phase and 55 to 50% by volume of a specifically lighter hydrocarbon phase was used as the disperse liquid mixture. The solvent was N-methylpyrrolidone with approximately 38 wt-% glycol. The hydrocarbon content of the solvent phase amounted to 24.5 weight-percent. The compositions were as follows:

| | Composition of the hydrocarbons in the solvent phase (heavy phase) (Wt-%) | Composition of the hydrocarbons in the hydrocarbon phase (light phase) (wt-%) |
| --- | --- | --- |
| Benzene | 22.0 | 9.0 |
| Toluene | 45.7 | 25.2 |
| Xylene | 13.1 | 9.6 |
| $C_9$ aromatics | 0.4 | 0.6 |
| Naphthenes | 0.8 | 2.0 |
| Paraffines | 17.2 | 40.7 |
| Olefins | 0.8 | 1.4 |
| Solvent | — | 11.5 |

The difference in density between the separated phases amounted to approximately 0.190 kg/dm$^3$.

The mixer is not shown. The separation of the dispersion was performed in the apparatus of the invention (see FIGS. 11, 12 and 13), which was constructed as follows:

The separating tank 1 is a cylindrical tank with a flat, horizontal bottom 23, a cover 24 and the cylindrical wall 25; its inside diameter is 200 cm, its height 80 cm.

To improve the separating action, seven layers of plate-like fittings 5 are mounted inside of the separating tank at a distance 13 of 75 mm apart. The angle of inclination of the plates amounts to 10°, the distance 20 between the peaks 7 and valleys 8 amounts to 49 cm, and the height of the outlets 9 and 10 is 37 mm each.

The distance 16 of the outlets 9 and 10 from the entrance of the liquid mixture into the plate-like fittings, baffle plates hereinafter, amounts to 70 cm, and the total length of the baffle places amounts to 140 cm.

A diffusing means 6, consisting of a filling, 10 cm deep, of irregular, metal turnings and of a perforated plate 22 (with 15 mm diameter holes 30 mm apart) is disposed directly ahead of the baffle plates.

The liquid mixture that is to be separated is delivered through the inlet 2 and the rectangular passage 26 to the liquid diffusing means 6 and flows successively through the metal turnings and the perforated plate 22 over the baffle plates 5 where the separation of the liquid mixture is performed, to the outlets 3 for the separated lighter liquid and 4 for the separated heavier liquid, where the separated pure liquids are withdrawn from the separating tank.

With the above-described arrangement a throughput was obtained in the separating tank, expressed in cubic meters of liquid per hour with reference to the total ground surface (in m$^2$ hour) of the separating tank, of more than 27 cubic meters per/square meter.

EXAMPLE 2

Figure 9:
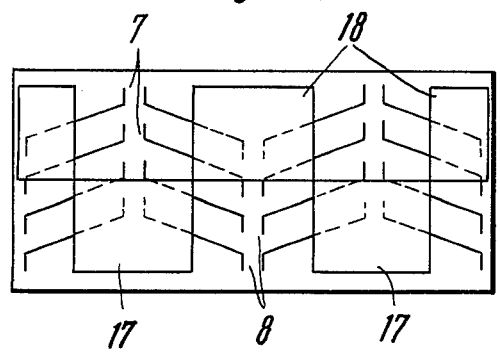
FIG. 9 is a cross section taken along line B'–B'' through FIG. 8.
Figure 10:
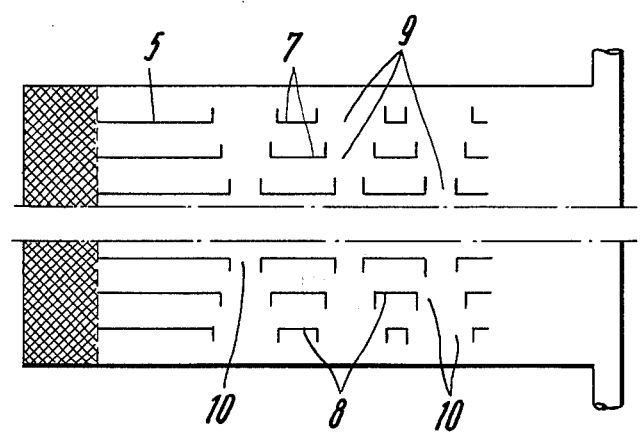
FIG. 10 is an embodiment of the invention with outlets of variable cross section.

Example 2 was performed according to a preferred embodiment, with an arrangement of deflector plates 17 in the lower part of the separating tank ahead of the peaks of the baffle plates 5 and an arrangement of deflector plates 18 in the upper part of the separating tank ahead of the valleys 8 in the baffle plates (FIGS. 8 and 9), the deflector plates being spaced 10 cm away from the baffle plates in the center of the separating tank and being directly adjacent, at their lower and upper end, respectively, to the baffle plates. In this manner it was possible to increase the throughput by about 6 vol-% in comparison to Example 1.

EXAMPLE 3

The disperse liquid mixture was a mixture consisting of 49 vol-% of the solvent phase and 51 vol-% of a specifically lighter hydrocarbon phase. The solvent was N-methylpyrrolidone with 10.9 wt-% of water. The hydrocarbon content in the solvent phase amounted to 9.3 wt-%. The composition of the solvent phase and of the specifically lighter hydrocarbon phase was as follows:

| Components | Solvent phase | Specifically lighter hydrocarbon phase |
| --- | --- | --- |
| Cyclopentene | 0.52 wt-% | 3.3 wt.-% |
| Cyclopentadiene | 0.46 wt-% | 1.5 wt-% |
| n-pentadiene | 1.83 wt-% | 9.0 wt-% |
| Isoprene | 2.03 wt-% | 10.6 wt-% |
| n + i-pentanes | 2.65 wt-% | 42.1 wt-% |
| Cyclopentane | 0.30 wt-% | 2.8 wt-% |
| n-Pentenes | 0.57 wt-% | 5.4 wt-% |
| Methylbutenes | 0.74 wt-% | 7.0 wt-% |
| Dicyclopentadiene and other $C_{10}$ hydrocarbons | 0.03 wt-% | 5.0 Wt-% |
| $C_6$ – $C_9$ hydrocarbons | 0.17 wt-% | 2.1 wt-% |
| N-methylpyrrolidone | 80.82 wt-% | 11.1 wt-% |
| $H_2O$ | 9.88 wt-% | less than 0.1 wt-% |

The separation of the disperse liquid mixture was performed by means of the apparatus of Example 2. With the apparatus of Example 2 it was possible to achieve a maximum throughput of 40 m$^2$/h per m$^2$ of separating tank ground area.

What is claimed is:

1. Apparatus for the separation of liquid dispersions of two or more mutually insoluble or only partially soluble liquids into the individual liquid phases comprising a separating tank having side walls and an inlet for the liquid mixture to be separated through a side wall, zig-zag shaped plate-like fittings arranged layer-wise one over the other in said tank, the peaks of which are located one over the other and whose valleys are located one over the other, said plate-like fittings extending across said tank from side wall to side wall thereof and horizontally in the direction of the liquid throughput, said plate-like fittings having outlets for the separated phases in said peaks and valleys opening up and down to the surrounding space of said tank, and, for the uniform distribution of the liquids to be separated, a diffusing device having liquid diffusing means in fiber and/or ribbon form adjacent the inlet to said tank and perforated plate means extending across a cross-sectional area of the tank following the diffusing means and immediately preceding the plate-like fittings.

2. Apparatus of claim 1 wherein the angle of inclination of the plate-like fittings between the peaks and valleys is 5° to 30°.

3. Apparatus of claim 1 wherein the ratio of the distance of the plate-like fittings to the difference in height between the peaks and the valleys is between 0.5 and 3.0.

4. Apparatus of claim 1 wherein the ratio of the distance between the peaks and the valleys to the distance between the peaks and the valleys to the distance between the plate-like fittings is between 2.0 and 15.0.

5. Apparatus of claim 1 wherein the outlets for the separated phases are ducts.

6. Apparatus of claim 1 wherein the outlets for the separated phases are tubes.

7. Apparatus of claim 5 wherein the height of the outlets is at least 25% of the distance between the individual plate-like fittings.

8. Apparatus of claim 1 wherein the outlets are arranged after a distance of one third of the length of the plate-like fittings from the entry of the liquids into the plate-like fittings.

9. Apparatus of claim 1 wherein at the end of the plate-like fittings plates are disposed ahead of the peaks in the lower part of the separating tank and ahead of the valleys in the upper part, the surface of said plates being perpendicular to the direction of flow of the liquids and being at such an angle that their distance from the plate-like fittings increases towards the center of the separating tank.

10. Apparatus of claim 1 wherein the overall cross section of the outlets increases in the peaks from the lowermost plate-like fittings to the uppermost plate-like fittings and/or in the valleys from the uppermost to the lowermost plate-like fittings.

11. Apparatus of claim 1 wherein the outlets in the peaks have a greater cross section or a smaller cross section than the outlets in the valleys.

12. Apparatus of claim 1 wherein the outlets in the peaks are disposed ahead of or behind the outlets in the valleys.

13. Apparatus of claim 1 wherein the fibrous and/or ribbon-like material consists of inorganic and/or metallic substances.

14. Apparatus of claim 1 wherein the fusing means are cylinder packing bodies.

15. Process for separating dispersed liquid phase systems carried out in the apparatus of claim 1.

16. Apparatus for the separation of liquid dispersions of two or more mutually insoluble or only partially soluble liquids into the individual liquid phases comprising
  i. a separating tank having side walls and an inlet for the liquid mixture to be separated through a side wall and zig-zag shaped plate-like fittings arranged layer-wise one over the other in said tank;
  ii. the peaks of said zig-zag fittings being positioned one over the other and the valleys of said zig-zag fittings being positioned one over the other;
  iii. said zig-zag fittings extending across said tank from side wall to side wall thereof and horizontally in the direction of the liquid throughput;
  iv. said zig-zag fittings having outlets for the separated phases in the peaks and valleys thereof, said outlets opening up and down to the surrounding space of said tank and extending from said peaks and valleys a distance which is at least 25% of the distance between individual plate-like fittings; and
  v. for the uniform distribution of the liquids to be separated, a diffusing device having liquid diffusing means in fiber and/or ribbon form adjacent the inlet to said tank and perforated plate means extending across a cross-sectional area of the tank following the diffusing means and immediately preceding the plate-like fittings.

17. Apparatus for the separation of liquid dispersions of two or more mutually insoluble or only partially soluble liquids into the individual liquid phases comprising:
  i. a separating tank having side walls and an inlet for the liquid mixture to be separated through a side wall and zig-zag shaped plate-like fittings arranged layer-wise one over the other in said tank;
  ii. the peaks of said zig-zag fittings being positioned one over the other and the valleys of said zig-zag fittings being positioned one over the other;
  iii. said zig-zag fittings extending across said tank from side wall to side wall thereof and horizontally in the direction of the liquid throughput;
  iv. said zig-zag fittings having outlets for the separated phases in the peaks and valleys thereof, said outlets opening up and down to the surrounding space of said tank and beginning after a distance of one-third of the length of the plate-like fittings from the entry of the liquids into the plate-like fittings; and
  v. for the uniform distribution of the liquids to be separated, a diffusing device having liquid diffusing means in fiber and/or ribbon form adjacent the inlet to said tank and perforated plate means extending across a cross-sectional area of the tank following the diffusing means and immediately preceding the plate-like fittings.

* * * * *